United States Patent [19]
Wagner

[11] Patent Number: 5,409,268
[45] Date of Patent: Apr. 25, 1995

[54] COUPLER FOR ELONGATE SUBSTRATES

[75] Inventor: René Wagner, Bad Aibling, Germany

[73] Assignee: N.V. Raychem S.A., Kessel-Lo, Belgium

[21] Appl. No.: 30,362

[22] PCT Filed: Sep. 19, 1991

[86] PCT No.: PCT/GB91/01607
§ 371 Date: Mar. 19, 1993
§ 102(e) Date: Mar. 19, 1993

[87] PCT Pub. No.: WO92/05382
PCT Pub. Date: Apr. 2, 1992

[30] Foreign Application Priority Data
Sep. 20, 1990 [GB] United Kingdom ............... 9020581

[51] Int. Cl.⁶ ............................................. F16L 35/00
[52] U.S. Cl. .................................... 285/81; 285/319; 285/320; 285/381; 285/423; 29/447
[58] Field of Search ................ 285/319, 320, 381, 81, 285/423; 29/447

[56] References Cited
U.S. PATENT DOCUMENTS

| 442,837 | 12/1890 | Ward | 285/319 |
| 937,437 | 10/1909 | Halstad et al. | 285/319 X |
| 2,336,656 | 12/1943 | Van Uum | 285/319 |
| 4,711,472 | 12/1987 | Schnell | 285/423 X |
| 4,743,079 | 5/1988 | Bloch | 285/381 |
| 4,834,423 | 5/1989 | DeLand | 285/319 X |
| 4,944,537 | 7/1990 | Usui et al. | 285/319 |

FOREIGN PATENT DOCUMENTS

| 329139 | 5/1958 | Germany . |
| 0002729A1 | 7/1979 | Germany . |
| 96321 | 7/1960 | Norway .................. 285/319 |
| 248162 | 3/1926 | United Kingdom . |

Primary Examiner—Dave W. Arola
Attorney, Agent, or Firm—Herbert G. Burkard; William D. Zahrt, II; A. Stephen Zavell

[57] ABSTRACT

A coupler for joining a polymeric elongate substrate to another substrate, comprising:
(1) a tubular element containing an aperture; and
(2) a penetrating member which is secured to the tubular element and which can move from a rest position to a working position wherein, in the working position, a portion of the penetrating member passes through the aperture and penetrates the surface of the elongate substrate.

18 Claims, 2 Drawing Sheets

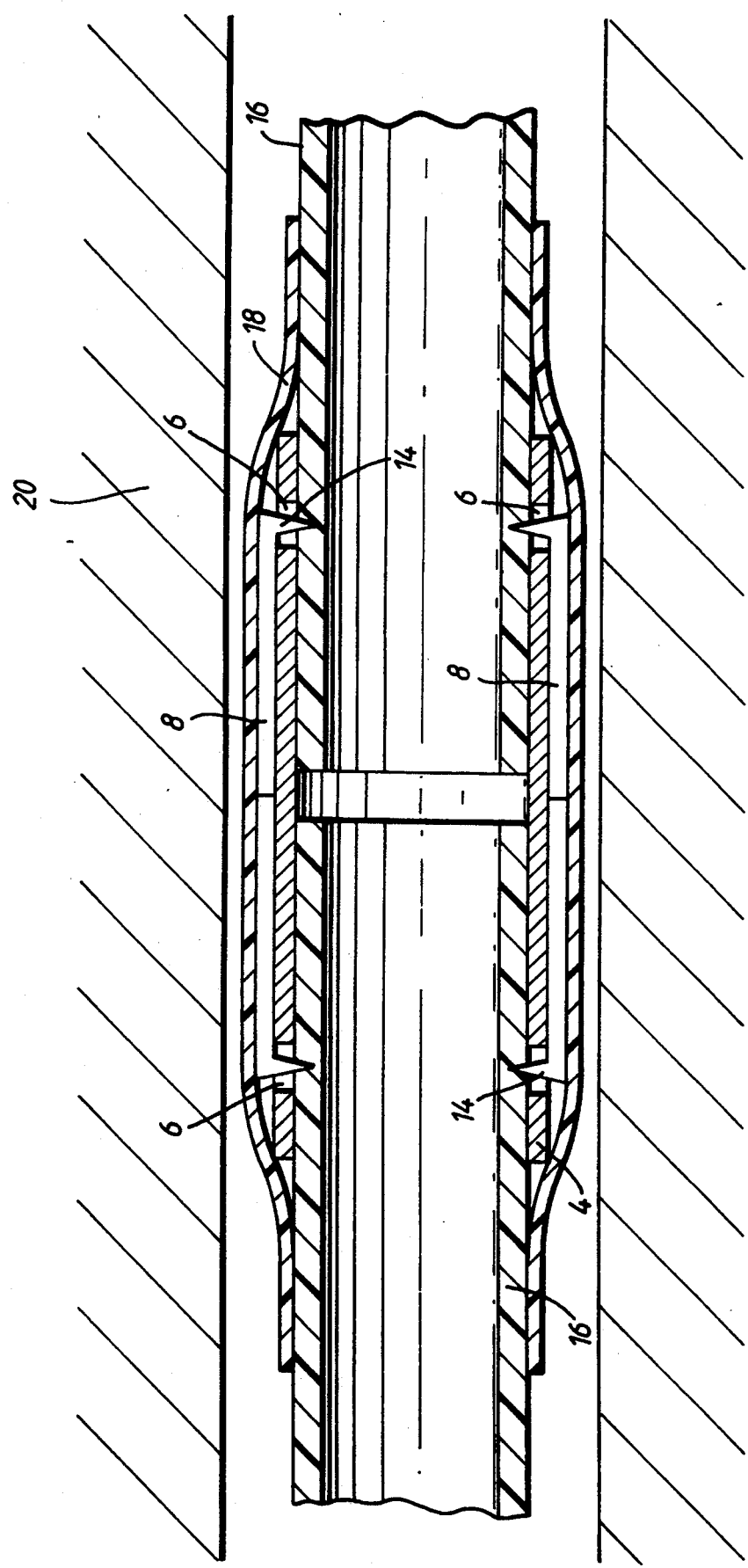

COUPLER FOR ELONGATE SUBSTRATES

This invention relates to a coupler for joining elongate substrates, especially pipes, more especially polymeric pipes.

There are a number of different methods for joining polymeric pipes known in the field. These fall into various categories, for example mechanical couplers, adhesive couplings, direct welding or fusion of the pipes eg by mirror welding or butt fusion, and the use of heat-recoverable polymeric and metallic coupling sleeves.

A recoverable coupling sleeve is a coupling sleeve whose dimensional configuration may be made to change when subjected to an appropriate treatment. Usually these coupling sleeves recover towards an original shape from which they have previously been deformed, but the term "recoverable" also includes an article which adopts a new configuration even if it has not been previously deformed. The coupler is typically heat recoverable, so that its dimensional configuration may be made to change when subjected to heat treatment. Usually the coupler is radially heat shrinkable.

U.S. Pat. No. 4,141,576 to Lupke is an example of a patent which describes a heat shrinkable polymeric coupling sleeve. In that patent the sleeve is shrunk into frictional engagement with two pipe ends. U.S. Pat. No. 3,847,694 to Stewing is similar describing a heat shrinkable resin sleeve used in conjunction with adhesive to join two pipes.

GB 1327442 describes a heat-shrinkable memory metal coupler sleeve. Memory metals exhibit useful dimensional changes during phase transformations, and hence can be used to make recoverable articles. The coupler exemplified has teeth on its inner surface which preferably partially deform the tubes to be joined to make the coupling.

Particular problems are encountered with couplers for elongate substrates for particular applications where a slim outer profile is desirable. For example where a hollow feedthrough is to be provided, eg for a duct in a wall, it is often desirable to provide the feedthrough from joined tubular lengths, rather than from one long tubular member. The outer diameter of the feedthrough is typically only slightly smaller than the inner diameter of the duct, so this means that bulky couplers can not be used. Also for feedthrough applications the joined tubular lengths will be subject to a tensile stress as the feedthrough is pulled through the duct. Thus the coupler must not only be slim, but must also be capable of withstanding high tensile stresses.

We have discovered a new coupler and method of joining a polymeric elongate substrate to another substrate, particularly for joining lengths of a feedthrough to each other. The coupler provides a slim connection and is provided with a penetrating member which preferably with the addition of heat, penetrates the outer surface of the polymeric elongate substrate, to provide tensile strength.

According, a first aspect of the invention provides a coupler for joining a polymeric elonagate substrate to another substrate, comprising:

(1) a tubular element containing an aperture; and
(2) a penetrating member which is secured to the tubular element and which can move from a rest position to a working position wherein, in the working position, a portion of the penetrating member passes through the aperture and penetrates the surface of the elongate substrate.

A second aspect of the invention provides a method of joining a polymeric elongate substrate to another substrate comprising (1) positioning one end of the coupler according to the invention over the end of the elongate substrate and
(2) causing the penetrating member to move from the rest to to the working position.

The portion of the penetrating member which penetrates the surface of the substrate is preferably, but not necessarily, an end portion.

Preferably the coupler of the invention is used to join two polymeric elongate substrates, for example two sections of a feedthrough, in an end to end configuration. In this case the tubular element preferably comprises at least two longitudinally spaced apertures which can be arranged in used to overlie respective elongate substrates. A penetrating member is therefore needed for each aperture stop. Thus either a single penetrating member is used having two end portions each of which is arranged to pass through respective apertures, and having an intermediate part of the penetrating member which is secured to the tubular element, or two separate penetrating members are provided, each having one or more end portions that can pass through respective apertures and being separately secured to the tubular element.

The penetrating member may have any convenient shape, but is preferably an elongate strip or rod, having a length at at least one end which extends at an angle to the main length of the strip. Thus in its working position the main length of the strip preferably extends substantially parallel to the tubular element, and an end length extends at an angle, ie it is arranged to pass through the aperture in the tubular member. Preferably the penetrating member is made from a resiliently biased material, for example from a spring metal such as spring steel. The resiliently biased member is preferably biased into its working position, and held against its bias in its rest position. Thus the relaxed state of the biased penetrating member corresponds to its working position, and the restrained state of the biased penetrating member corresponds to its rest position. Maintaining the member in its rest position is preferably achieved by a restraining member, which can be released so that the member springs back to its working position. As an alternative, the penetrating member may be made, for example, from a memory metal member, which may be heated to cause the member to move from its rest to working position.

In another embodiment, the penetrating member may comprise a C-shaped spring member which extends circumferentially around the tubular element, and has one or more radially-directed teeth which can pass through circumferentially spaced apertures in the tubular element. The spring member may be resiliently biased, a bi-metallic element, or a memory metal.

Where a resiliently biased penetrating member is used, the restraining member to hold it in its rest position preferably comprises a removable restraint, for example a wedge. Where the penetrating member is an elongate strip, which is fixed at one point to the tubular element, it is preferably biased so that, in its released working position, the main length of the strip extends substantially parallel to the tubular element. In this case, the wedge is preferably positioned adjacent the point of fixing to the tubular element, to force the main length of the penetrating member, in its rest position, to extend at an angle to the tubular element. The wedge is thus preferably positioned between the penetrating member and the tubular element. When the wedge is released, the resilient biased penetrating member is arranged to spring back so that its main length lies substantially flush with the tubular element, with the angled end of the penetrating member passing through the aperture in the tubular element. As an alternative to a wedge any other mechanical stopping device may be used to hold the penetrating member in its rest position. As another example of restraining member, a meltable mass can be used, which for example flows on the application of heat to allow the resilient penetrating member to spring to its working position.

Preferably both the tubular element and the penetrating member comprise a metal. The penetrating member is preferably secured to the tubular element by welding.

In order to increase the pull-out strengths of the coupler it is preferable to arrange a number of penetrating members around the circumference of the tubular element. Therefore in a preferred embodiment the tubular element of the coupler comprises two or more circumferentially spaced apertures, each having an associated end of a respective penetrating member which can pass through it.

A particularly preferred construction of penetrating member, for joining two polymeric conduits, comprises a strip of spring steel which is welded towards its centre to the tubular element, and which extends generally parallel to the axis of the tubular element. The strip is resiliently biased to lie flush with the tubular element. However the length of strip on either side of the weld can be directed at an angle away from the tubular element by positioning two wedges, one on either side of the weld, between the penetrating member and the tubular element. Thus, with the wedge in position, the penetrating member forms a shallow "V" shape on the surface of the tubular element. Each end of the penetrating member is angled in a direction towards the tubular element, so that when the wedge is removed, and the penetrating member springs back to its relaxed working position the angled ends pass through the apertures in the tubular elements.

In a preferred method according to the invention heat is preferably applied to the penetrating member, at least in the region adjacent to the apertures. Contact of the hot penetrating member with the polymeric outer surface of the substrate causes local softening, which facilitates penetration of the substrate by the penetrating member. The heat may be provided by any suitable source, but is preferably applied externally, for example with a gas torch. Where the restraining member comprises a meltable mass, or where the penetrating member comprises a memory metal, the heat applied may also be used to recover the memory metal or to melt the mass.

The depth of penetration of the end of the penetrating member affects the tensile strength of the coupling. Preferably the end penetrates at least 75% through the depth of the polymeric substrate.

Where a sealed coupling is required, the invention also provides for a sealing cover to be positioned around the tubular element after the penetrating member has been moved from its rest to working position. Preferably the sealing cover is a heat recoverable, preferably heat shrinkable polymeric sleeve, which is heated, for example with a gas torch, to seal it over the tubular element and also to extend beyond the end of the tubular element on to the elongate substrate. This additional sealing is particularly useful for the application as a coupler for lengths of a feedthrough or duct, where the contents of the feedthrough or duct are to be protected from exterior environmental contamination.

A heat recoverable sleeve may be positioned around the coupler for other purposes, or in addition to its sealing function. Thus the sleeve can render the joint pressure tight (which is necessary if a pulling wire is to be blown down the duct), it can improve the axial strength of the coupler and it can apply pressure to the penetrating member to improve penetration or resist pull-out forces.

Thus the invention provides a coupler and a method which is particularly applicable for joining lengths of a feedthrough. The activation of the penetrating members provides a coupling with good tensile strength, and the preferred additional sealing sleeve provides protection from contamination from the environment.

An embodiment of the invention will now be described, by way of example, with reference to the accompanying drawings, wherein:

FIG. 3 is a longitudinal sectional view, showing the coupler and sleeve of FIG. 2 joining the two feedthrough conduits, installed within a duct in a wall.

Figure 1:
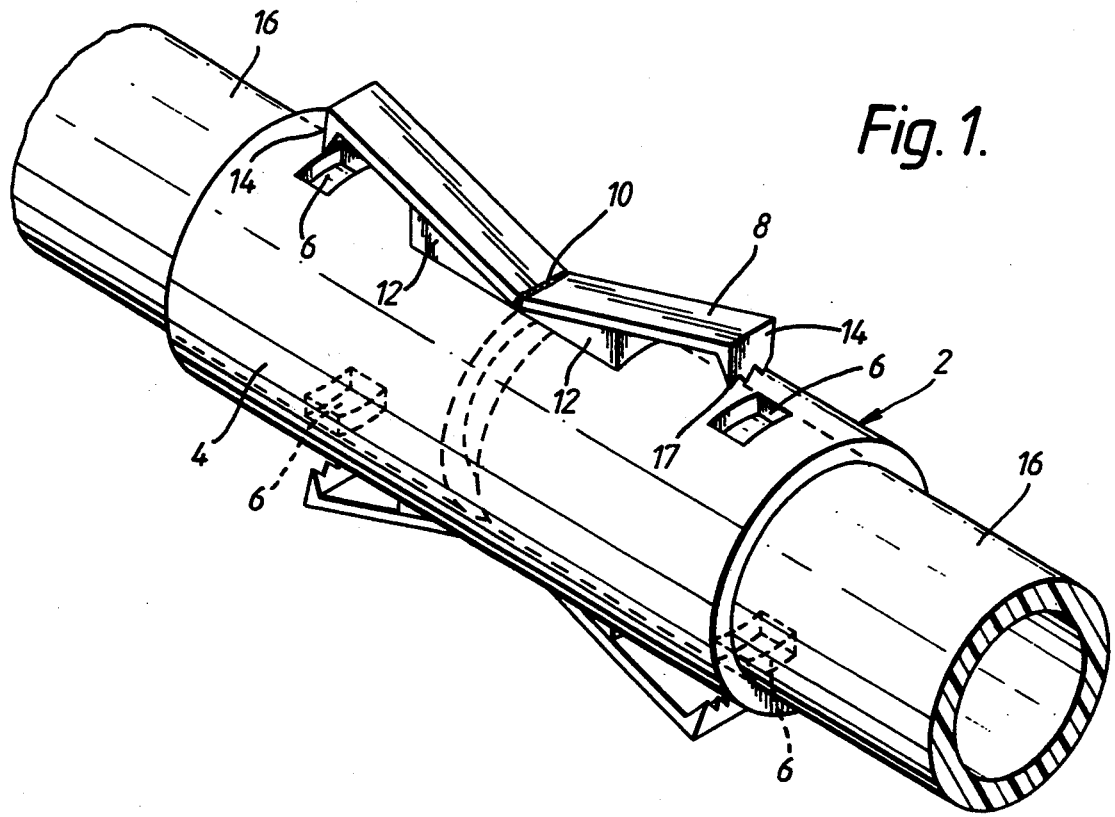
FIG. 1 is a perspective view showing a coupler according to the invention in position ready to join two feedthrough conduits in end to end relationship.

Referring now to the drawings, FIG. 1 shows a coupler 2 comprising a tubular element 4 containing aperture 6 and a penetrating element 8. The are four apertures 6 in the tubular element 4, there being two at each end of the tubular element 4, diametrically opposed to each other. The penetrating member 8 comprises a strip of spring steel, which is welded to the tubular element 4 at weld line 10, which is half-way along its length. The spring steel penetrating member 8 is biased so that its main length lies substantially flush with the surface of the tubular element 4, in its working, relaxed position. However, wedges 12 are positioned adjacent the weld line 10 between the penetrating member strip 8 and the outer surface of the tubular element 4. These wedges 12 cause the penetrating member 8 to extend away from the surface of the tubular element, so that the penetrating member forms an open "V" shape centred on the weld line 10. Each end length of the penetrating member 8 is angled downward towards the surface of the tubular element 4 at an angle of from 70° to 90°. The length of the penetrating member is arranged so that when the wedges 12 are removed the main length of the penetrating member 8 springs flush with the tubular element 4, and the angled ends 14 of the penetrating member pass through the aperture 6 in the tubular element. The angled ends may be provided with one or more teeth 17 to assist penetration. The coupler is positioned around a butt joint between two polymeric feedthrough conduits 16. One pair of apertures 6 overlie the first conduit, and the other pair overlie the other conduit.

In order to install the coupler of FIG. 1, the wedges 12 are preferably removed, and simultaneously or before, the surface of the penetrating member in the region of the aperture 6 is preferably heated so that when the angled ends 14 contact the surface of the polymer it is softened. This heat is preferably provided by gas torch.

Figure 2:
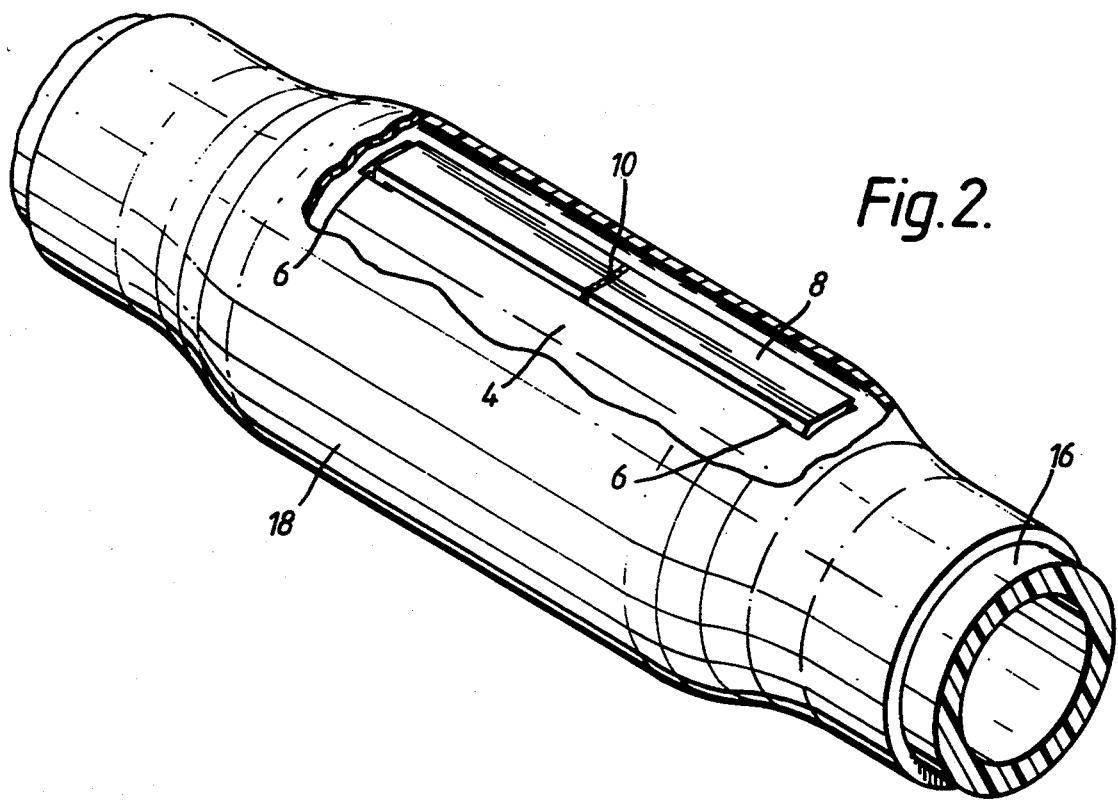
FIG. 2 is a perspective view, showing the coupler of FIG. 1 installed to join the feedthrough conduits together, in combination with an outer sealing sleeve.

FIG. 2 shows the coupler of FIG. 1 with the wedges 12 removed, after heating of the polymer conduit 16. The angled ends 14 have passed into the aperture 6, and penetrated the outer surface of the polymer conduit 16. An outer heat shrinkable sleeve 18 has been installed around the coupler 2 and the polymer conduits 16 in order to provide sealing. The sleeve 18 extends beyond the ends of the coupler 2 and over the surface of the polymer conduits 16.

FIG. 3 is a cross sectional view of the device of FIG. 2 installed in a channel in the ground 20. It will be seen from this figure that the flush profile of this coupler means that very little clearance is needed between the outer surface of the feedthrough sections and the wall of the channel. This figure also shows penetration by the end members 14 into the surface of the feedthrough section. The flush profile also assists the coupler to pass through the type of digging machinery frequently used for laying conduits in trenches in the ground.

I claim:

1. A coupler for joining together two polymeric elongate substrates which comprises:
   (1) a tubular member for receiving within it such substrates;
   (2)
      at least one penetrating member secured to the outside of the tubular member,
      each said penetrating member having at least one penetrating element for penetrating and engaging the elongate substrates, at least two penetrating elements being longitudinally spaced along the tubular element so as to engage different substrates, the tubular member having at least two longitudinally spaced apertures through which the penetrating elements can extend in a working position so as to penetrate and engage with the elongate substrates;
      each said penetrating member being an elongate member, the main length of which extends, in its working position, substantially parallel to the tubular element; and
   (3) rest means for maintaining the penetrating elements in a rest position in which they do not engage the elongate substrates but which can be actuated to allow the penetrating elements to move from the rest position to a working position.

2. A coupler according to claim 1, wherein the penetrating member is an elongate member, the main length of which extends, in its working position, substantially flush with the outer surface of the tubular element, and one end of which is angled towards the tubular element, so that, in the working position, it passes through the aperture in the tubular element.

3. A coupler according to claim 2, in which the angle between the main length and the end of the penetrating member is from 70° to 90°.

4. A coupler according to claim 1 wherein the penetrating member comprises a resiliently biased member which is held against its bias in the rest position, by a restraining member, and which when released is biased into the working position.

5. A coupler according to claim 4 wherein the restraining member comprises a removable restraint.

6. A coupler according to claim 5 wherein said removable restraint is a wedge.

7. A coupler according to claim 5 wherein said removable restraint is a meltable mass.

8. A coupler according to claim 1 wherein the tubular element and the penetrating member comprise metal, and wherein the penetrating member is secured to the tubular element by welding.

9. A coupler according to claim 1 comprising at least two circumferentially spaced apertures, each with an associated end of a penetrating member which can pass therethrough.

10. A coupler according to claim 1 additionally comprising a heat recoverable sleeve positionable around the coupler.

11. A coupler according to claim 1 in which the portion of the penetrating member which penetrates the surface is provided with at least one tooth.

12. A coupler according to claim 1 in which each penetrating element is an end portion of the penetrating member.

13. A coupler according to claim 1 in which penetrating elements are provided at each end of the penetrating member, and the penetrating member is secured at an intermediate part thereof to the tubular element.

14. A method of joining a polymeric elongate substrate to another substrate comprising:
   (1) positioning one end of a coupler over the end of the elongate substrate, the coupler including:
      (a) a tubular member for receiving within it such substrates;
      (b)
         at least one penetrating member secured to the outside of the tubular member,
         each such penetrating member having at least one penetrating element for penetrating and engaging the elongate substrates, at least two penetrating elements being longitudinally spaced along the tubular element so as to engage different substrates,
         the tubular member having at least two longitudinally spaced apertures through which the penetrating elements can extend in a working position so as to penetrate and engage with the elongate substrates;
         each such penetrating member being an elongate member, the main length of which extends, in its working position, substantially parallel to the tubular element; and
      (c) rest means for maintaining the penetrating elements in a rest position in which they do not engage the elongate substrates but which can be actuated to allow the penetrating elements to move from the rest position to a working position, and
   (2) causing the penetrating member to move from the rest to the working position.

15. A method according to claim 14, comprising the additional step of applying heat to the penetrating member, at least in the region adjacent to the aperture in the tubular element.

16. A method according to claim 15, wherein the heat is applied by an external heat source.

17. A method according to claim 14, wherein the penetrating member comprises a resiliently biased member which is held against its bias in its rest position by a restraining member, wherein the method comprises moving or removing the restraining member to release the penetrating member, thereby causing it to move from its rest to its working position.

18. A method according to claim 14 comprising recovering a heat recoverable, polymeric sleeve over the polymeric elongate substrate and coupler, after the penetration of the substrate has taken place.

* * * * *